United States Patent [19]

Joseph et al.

[11] Patent Number: 5,844,799
[45] Date of Patent: Dec. 1, 1998

[54] METHOD FOR SIMULATING THE FILLING OF A SEDIMENTARY BASIN

[75] Inventors: Philippe Joseph, Marly le Roi; Didier Granjeon, Rueil-Malmaison, both of France

[73] Assignee: Institut Francais du Petrole, Rueil-Malmaison, France

[21] Appl. No.: 788,182

[22] Filed: Jan. 24, 1997

[30] Foreign Application Priority Data

Jan. 26, 1996 [FR] France .................................. 96 01461

[51] Int. Cl.$^6$ ....................................................... G01V 1/00
[52] U.S. Cl. ........................................................ 364/420
[58] Field of Search .................................. 364/421, 422, 364/420; 73/152.01, 148

[56] References Cited

U.S. PATENT DOCUMENTS 5,220,504  6/1993  Holzhausen et al. .................... 364/421
5,466,157  11/1995  Henderson et al. .................... 364/421

FOREIGN PATENT DOCUMENTS 1219944  3/1987  Canada .
2226884  11/1990  United Kingdom ................... 364/421
2242979  10/1991  United Kingdom .

OTHER PUBLICATIONS

Geological Society of America Bulletin, vol. 96, Nov. 1985, Bolder, USA, pp. 1457–1465, XP000605715, P.M. Kenyon et al: "Morpohlogy of a Delta Prograding by Bulk Sediment Transport".

Earth Surface Processes and Landforms, vol. 13, Sep., 1988, GB, pp. 487–500, XP000605719, Z.B. Begin: "Application of a Diffusion–Erosion Model to Alluvial Channels Which Degrade Due to Base–Level Lowering".

Basin Research, vol. 4, 1992, pp. 133–146, XP000605803, JC. Rivanaes: "Application of a Dual–Lithology, Depth–Dependent Diffusion Equation in Stratigraphic Simulation".

The American Associateion of Petroleum Geologists Bulletin, vol. 74, No. 3, Mars 1990, Tulsa, USA, pp. 273–295, XP000605713, D.T. Lawrence et al: "Stratigraphic Simulation of Sedimentary Basins: Concepts and Calibration".

*Primary Examiner*—Ronald L. Biegel
*Attorney, Agent, or Firm*—Antonelli, Terry, Stout & Kraus, LLP

[57] ABSTRACT

The invention relates to the creation of a numerical deterministic model of the diffusive type allowing 2D or 3D simulation of the filling of sedimentary basins by siliciclastic and carbonate sediments. A read only memory known data relative to the architecture of a basin and measuring data, well logs, seismic surveys, etc, a set of input data relative to the accomodation created by subsidence and eustasy, the deposit and the production of fluvial or marine sediments, and physical transport parameters such as diffusion coefficients of the various lithologies are created. This set of data is applied to a numerical model. The results that can be deduced therefrom concerning the geometry and the lithologies of the sedimentary units are compared with the measuring data, and the input data are processed stepwise by inversion. The model thus created allows the reconstruction of, for example, the volumetric partitioning, the distortion of the genetic units or the sedimentary geometries observed. The method can be applied for oil reservoir prospecting.

16 Claims, 2 Drawing Sheets

METHOD FOR SIMULATING THE FILLING OF A SEDIMENTARY BASIN

BACKGROUND OF THE INVENTION

1. Field of the Invention

The invention relates to the creation of a numerical stratigraphic model allowing two or three-dimensional (2D or 3D) simulation of the multilithologic filling of a basin, in order to simulate the stratigraphic response of the sedimentary system to variations in time of the eustasy, the subsidence, the sedimentary deposits and the physical parameters governing the transport of sediments in the basin.

2. Description of the Prior Art

Recent geological progress, that gave rise during the past twenty years to seismic stratigraphy, then to genetic stratigraphy, deeply changed the understanding of the history of the sedimentary filling of basins on large time and space scales by showing the primordial influence of three main parameters: eustasy, tectonics and the sedimentary flux.

Many models, notably deterministic numerical models, were created in order to be able to apprehend the geometric and lithologic implications of these new approaches.

These numerical models simulate the transport and the sedimentation (or the erosion) of sediments in the basin based upon a complex description of the nature, from an estimation of the eustasy, of the subsidence and of the sedimentary deposit. The term eustasy refers to the surface variations of the oceans recorded simultaneously on the whole of the terrestrial surface, and the term subsidence refers to the absolute displacement of the bottom of a sedimentary basin in relation to a fixed marker level in time. These models thus allow testing of the influence of various concepts (relation between the climate and the eustasy, etc.) on the layout of the sedimentary units. Furthermore, when applied to real cases, they allow the testing of the coherence of the parameters introduced into the model, such as the eustatic and tectonic variations, and to confirm the geologic interpretation of the basin studied.

A model is expected to be able to define the great facies variation trends (variation of the sand/clay ratio, carbonate content, etc.) within genetic units. To that effect, a multi-lithologic modeling is required. The model must be able to simulate the transport and the sedimentation of various siliciclastic (sand, clay, etc.) and carbonate lithologies (reef, deep-sea carbonate mud, bioclasts, etc.) so that these facies variation trends are a result of the model, independent of geologic a priori such as sandy alluvial plain and clayey marine area. In this ideal model, the siliciclastic sediments are introduced into the basin by rivers and by the sea currents. The carbonates are produced in the marine area by following a law depending on the bathymetry and the turbidity of the water.

$$P = P_o A_{turb.} e^{-kz}$$

P carbonates productivity $P_o$ optimum productivity $A_{turb.}$ attenuation factor depending on the turbidity (turb.) of the water $e^{-kz}$ attenuation factor depending on the bathymetry (z).

After being introduced at the level of the basin boundaries, or produced in the basin, the sediments are transported, then settle.

There are three great deterministic model families that govern the transport of sediments:

the particulate models based on the solution of the motion of the particles (calculation of the water flow, then relation between the water flux and the sediments flux);

the diffusive models based on a diffusion equation where the definition of the diffusion coefficient is refined (taking into account of several lithologies, of the water flux, of the depositional environment, etc.); and the geometric models based on a definition of the geometric profile of the depositional environments (length and slope of the alluvial plain, etc.) or on a geometric definition of the rate of sedimentation (exponential decrease in the marine area, etc.).

Particulate models use a careful description of the sedimentary processes and they are thus as chaotic as nature. They allow the obtaining essentially of simulations at the reservoir scale (length of the order of 0.5 to 50 km and duration of the order of 5 to 500 ka). The diffusive and geometric models both provide approximations of the natural processes. They are much more stable than the reality which they account for; they only provide a smoothed estimation of nature. These models are preferably applicable at the scale of the basin (length of the order of 10 to 1000 km and duration of the order of 0.1 to 10 My.

The geometric models, based on an approximation of the basin morphology, are mainly applicable to simple 2D cases in which the subsidence, the nature of the sediments and the climate do not disturb the definition of the equilibrium profile significantly.

The more general diffusive models, based on an approximation of the sediments physics, are applicable to 3D cases and can deal with the transport and the sedimentation of multiple lithologies.

Various known diffusive models are for example described by:

Kenyon and Turcotte, 1985, Morphology of a Delta prograding by Bulk Sediment Transport. in Geol. Soc. Amer. Bull., 96, 1457–1465;

Begin Z. B., 1988, Application of a Diffusion-Erosion Model to Alluvial Channels which Degrade Due to Base-Level Lowering. Earth Surface Processes and Landforms, 13, 487–500;

Rivenaes, J. C., 1988, Application of a Dual-Lithology, Depth Dependent Diffusion Equation in Stratigraphic Simulation, Basin Research, 4, 133–146.

One advantage of the diffusive models is to read allowing a return to the geologic concepts by quantifying certain relations such as the variable duration of the progradation and retrogradation phases of the genetic units, or the evolution of the sandiness according either to the bathymetry or to the prograding or retrograding trend of the littoral.

The object of the prior models is mainly a numerical experimentation of theoretical concepts along profiles in 2D cases.

SUMMARY OF THE INVENTION

The object of the present invention is a method for creating a model intended to simulate the sedimentary filling of basins on large time and space scales.

The modeling method according to the invention allows the creation of a 2D or 3D deterministic model of the diffusive type that simulates the multilithologic filling of a sedimentary basin. It comprises, from known field data relative to the architecture of the basin and from measured data such as well logging data or seismic data, the creation of a set of input data relative to an accomodation by subsidence and eustasy, the deposition of fluviatile or marine sediments and the transport thereof, and physical parameters such as diffusion coefficients of the various lithologies. The method comprises, by means of an iterative process:

gridding of the basin in grids of regular dimensions;

solving large-scale diffusive transport equations according to an explicit pattern with finite volumes and constant time intervals, so as to simulate the flux of each lithology deposited on each grid; and comparing the simulation results with the field data and stepwise modification of the input data by inversion.

The inversion stage can be achieved for example by means of a trial-and-error method.

The diffusive model obtained allows a 3D apprehension of the multilithologic filling of a basin and thus testing of the coherence of a data base, or even to help prediction of the position and the geometry of the sedimentary bodies. It leads to a realistic prediction of the thicknesses of the sedimentary bodies and of the facies. These parameters, adjusted to the well data, thus allow refinement of global knowledge of the basin by clarifying the location and the quality of the bodies likely to be hydrocarbon reservoirs.

Since the model according to the invention requires, in order to reproduce the sedimentary geometries, a perfect reconstruction of the physical parameters on a large scale (flux quantification, diffusion coefficients quantification etc.), it is necessary to identify which accomodation, sedimentary deposit and diffusion coefficient couplings have to be defined in order to reconstruct the geometries observed, and consequently the proposed correlation pattern of the well data. The geologic coherence, or the impossibility, of these various couplings thus allows confirming or invalidation of the selection of a correlation pattern.

BRIEF DESCRIPTION OF THE DRAWINGS

Other features and advantages of the method according to the invention will be clear from reading the description hereafter, with reference to the accompanying drawings in which.

DESCRIPTION OF THE INVENTION

Figure 1:
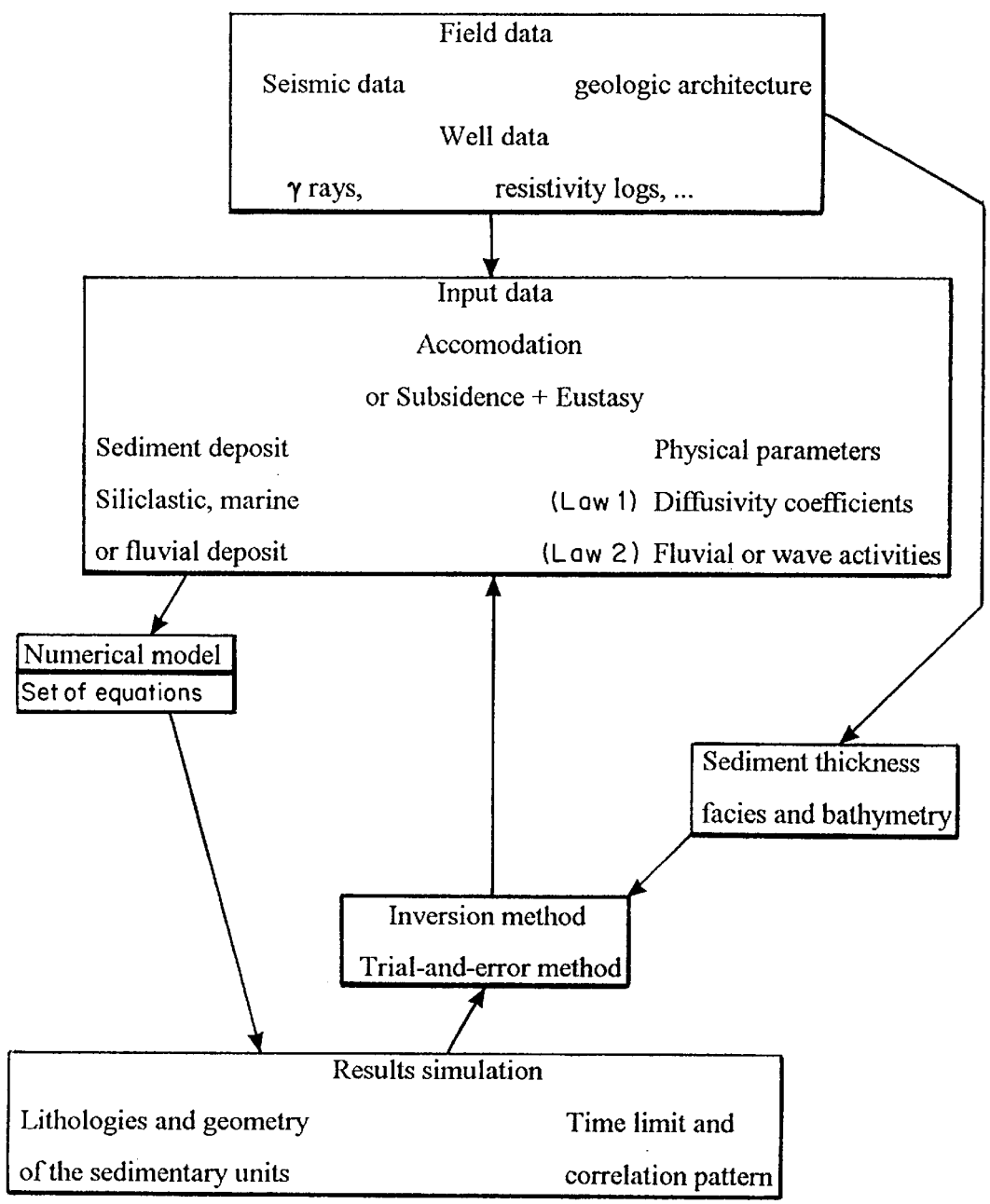
FIG. 1 illustrates the modeling process.
Figure 2:
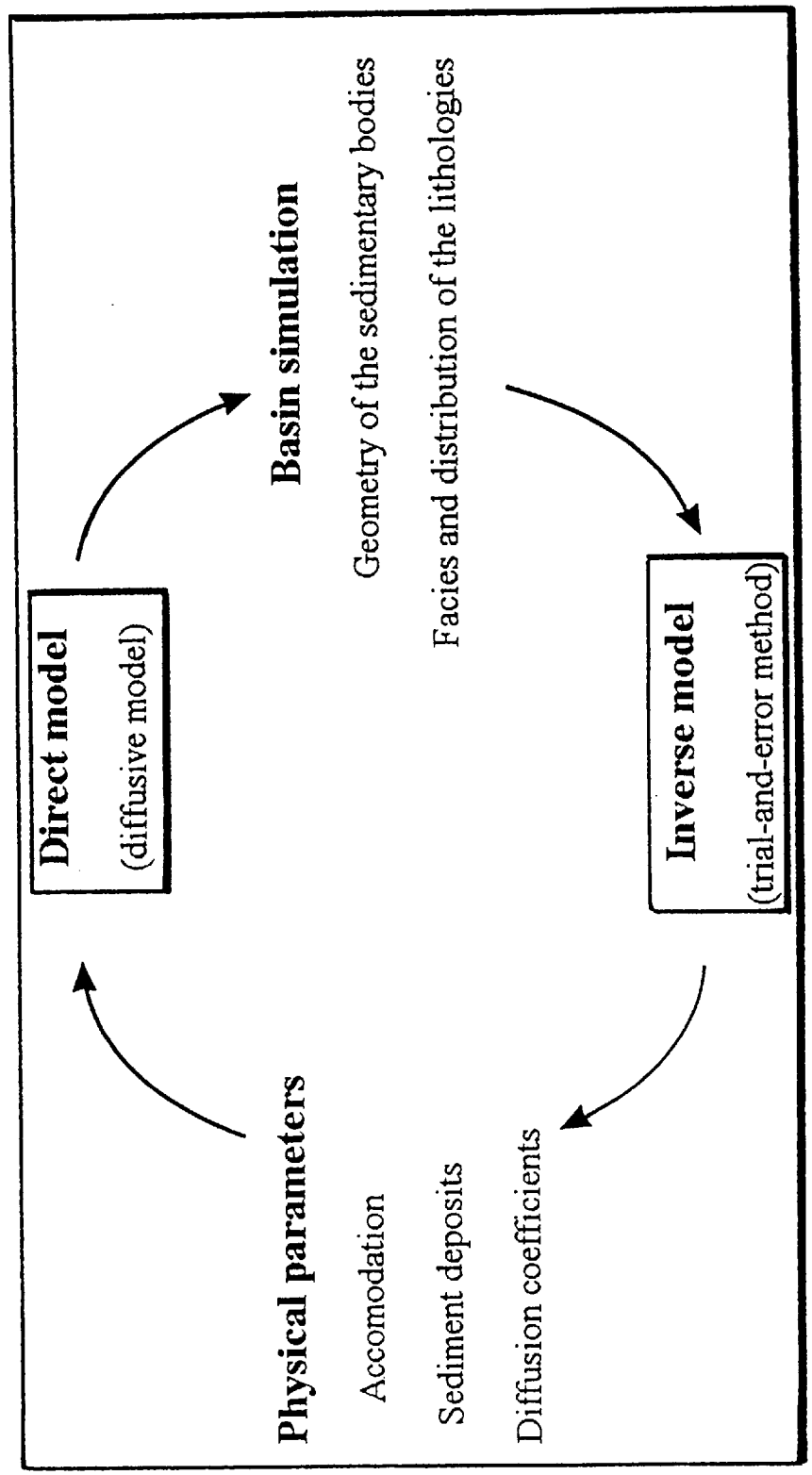
FIG. 2 shows a model optimization pattern using a trial-and-error method.

The deterministic model of the invention is constructed in several successive stages. In a first stage, the accomodation for the sediments is defined. The sediments are introduced thereafter and the sedimentary production in the basin is simulated. These sediments are then distributed in accordance with macro-transport laws that will be defined in the description hereafter while limiting the erosion to the weathering layer.

1) Accomodation creation

The accomodation for the sedimentary filling of the basin is the sum of the eustasy and of the subsidence. It has been chosen to be defined point by point, either from eustatic curves and subsidence maps or directly from accomodation maps, thus without using physical models relating the eustasy to the climate, or the subsidence to tectonic, isostatic or thermal processes.

Although it does not modify the accomodation, compaction influences the sedimentary filling by modifying the thickness of the sedimentary layers. In order to account for the mechanical compaction, it has been chosen to relate directly the porosity of the sediments to the maximum burial reached thereby, by a relation of exponential form which allows the obtaining of a good approximation of the compaction as defined by:

Beaudoin et al., 1987, Mesure Directe de la Compaction Dans les Sédiments, in Berthon, J. L., Burollet, P. F., and Legrand, Ph. (eds), Genése et évolution des bassins sédimentaires. Notes et Mémoires n° 21, Total-Compagnie Francaise des Pétroles.

In order to take in account the case of multilithologic sediments, it has been considered that each lithology has a porosity independent of the others, which amounts to classifying the sedimentary layers consisting of a mixture of several lithologies such as sand and clay as a superposition of multiple sublayers consisting of pure lithologies. The porosity linked with each lithology is thus processed individually according to the maximum burial reached by the sedimentary layer.

for each lithology $$i \rightarrow \Phi_i = \Phi_{r,i} + (\Phi_{o,i} - \Phi_{r,i})e^{-z/z_i}$$

with $\Phi_i$ porosity of the lithology i (in %)

$\Phi_{r,i}$ residual porosity of the lithology i (in %)

$\Phi_{o,i}$ deposit porosity of the lithology i (in %)

z maximum burial reached by the sedimentary layer studied (in m)

$z_i$ reference burial of the lithology i (in m).

This definition of a porosity linked with the lithologies allows in particular the simulation of the individual transport of each lithology and to deduce therefrom the consequences on the porosity of the sedimentary layers.

II) Introduction and production of sediments

The accomodation being thus created, the second stage of formation of the model is introducing sediments into the basin, or in producing them inside the marine area.

1) Introduction of sediments in the area studied

The flux of sediments at the boundaries of the area studied represents geologically the sedimentary deposit responsible for the filling of the basin. It can be perceived physically in terms of sediment flux boundary conditions.

These boundary conditions are set either by imposing the exact value of the flux in a sector of the boundary, or by imposing a continuous evolution on the sediment flux. The first case represents a deposit zone imposed by conditions exterior to the basin, such as the outlet of a river draining a river basin exterior to the basin. The second case represents a free zone along which the flux of sediments is governed by physical parameters within the basin, such as the characteristics of the waves. During the simulation of a basin, it is possible to combine these two types of boundary conditions by distinguishing for example a continental zone where the flux is imposed by the external fluvial deposits and a marine zone where the flux is defined by the internal transport laws.

2) Sedimentary production in the area studied

The sediments can also be produced inside the basin, and more particularly in the case of carbonate sediments. For this phase of the construction of the model according to the invention, it has been chosen to simulate this production by means of an empirical formula relating the production rate at each point of the basin to the bathymetry and to the flux of sediments as defined for example by:

Lawrence et al., 1990, Stratigraphic Simulation of Sedimentary Basins: Concepts and Calibration, in Amer. Assoc. Petrol. Geol. Bull., 74, 3, 273–295.

For each lithology $i \Rightarrow P_i = P_{o,i} B_i \prod_{j \neq i} F_{j,i}$ with
- $P_i$ production rate of the lithology $i$ (en m/s)
- $P_{o,i}$ maximum production rate of the lithology $i$ (in m/s)

influence of the bathymetry $\quad B_i = \begin{cases} 0 & \text{if } b \leq 0 \\ \dfrac{b}{b_i} & \text{if } 0 < b \leq b_i \\ e^{-\beta_i(b-b_i)} & \text{if } b > b_i \end{cases}$

- $B_i$ influence of the bathymetry (dimentsionless)
- $b$ bathymetry (in $m$)
- $b_i$ bathymetric threshold (in $m$)
- $\beta_i$ attenuation coefficient (in $m^{-1}$)

influence of the lithology $j \quad F_{j,i} = \begin{cases} 1 & \text{if } Q_j \leq S_{j,i} \\ e^{-\gamma_{j,i}(Q_j - S_{j,i})} & \text{if } Q_j > S_{j,i} \end{cases}$

- $F_{j,i}$ sensitivity of the lithology $i$ to the flux of the lithology $jj$
- $Q_j$ flux of the lithology $j$ (in $m^2/s$)
- $S_{j,i}$ inhibition start threshold (in $m^2/s$)
- $\gamma_{j,i}$ sensitivity coefficient (in $m^2/s$)

In order to take into account the erosion of the reefs when the latter are emerging, the process of mechanical alteration of these reefs has been simulated while considering that any reef sediment situated in the weathering layer in the continental area is changed into a "bioclastic" sediment. The reef and bioclastic lithologies are transported in the basin like the siliciclastic sediments.

III) Sediment transport

After defining the accomodation and the amount of sediments that must fill the basin, the model distributes the sediments throughout the basin in accordance with large-scale transport laws established by developing known transport laws, allowing the estimation of the flux of each lithology flowing in the basin at all the points thereof.

diffusion equation $Q = -K \dfrac{\partial h}{\partial x}$ conservation of mass $\dfrac{\partial h}{\partial t} = -\dfrac{\partial Q}{\partial x}$ with
- $Q$ sediment flux (in m²/year)
- $K$ diffusion coefficient (m²/year)
- $h$ altitude of the point studied (in m).

with
- Q sediment flux (in m²/year)
- K diffusion coefficient (m²/year)
- h altitude of the point studied (in m).

The rate of sedimentation or of erosion is defined by coupling these laws with the mass conservation principles. This sedimentary transport is however limited to the weathering layer, and the erosion velocity at a given point cannot exceed the local weathering velocity.

Creation of a 3D large-scale transport law

The small-scale continental transport law shown above represents water and sediment flows on a time scale of the order of several hours to several months, and space scales of the order of several square kilometers. In order to be able to apply these laws to greater time and space scales, it was necessary to transform them into large-scale transport laws.

In order to pass from the 2D small-scale continental area to the 3D large-scale basin, it is necessary to:

take into account the diversity of the flows in the continental area, from the mean lower low water regimes where the water is canalized in channels to the flood regimes where the water spreads over all of the flood plains, extrapolate to the marine area a transport law validated for the continental area, and to define the way to simulate the action of the waves, describe the differential although simultaneous transport of several lithologies, and take into account the limited sediment availability.

3D writing of the fluvial transport law

In order to express this transport law in three dimensions and to take into account the various flow regimes of the water, from floods to mean lower low waters, it is assumed that the flux of sediments is, at any point of a continent, proportional to an intrinsic diffusion coefficient, to the water flux and to the basin slope.

The water flux, constant at the time of the 2D small-scale sediment transport study, now comprises the variability with time of the various water flow regimes. Three basic flow modes have been defined.

a) The straight flow corresponding to the case where the water flowing in at a given point of the basin is entirely redistributed in the direction of the greatest slope, and where the time interval between two simulation instants is short in relation to the period of modification of the stream. This period is equal to the meanderization period if the basin is studied with very fine grids, whose size is of the order of a hundred meters, and it is equal to the avulsion period for grids of the order of one kilometer. Such a water flow leads to a sediment flow in a single direction at every moment.

b) The flow known as "wild" flow corresponding more particularly to the case of a large-scale transport of the sediments, where the simulation time interval used is of the order of a millennium. It is thus greater than the period of change of the streams. For such a flow type, it is thus no longer possible to suppose that an individual stream has kept a single direction during the time interval, and it becomes necessary to take into account the various courses that the water may have followed. Furthermore, unlike the small-scale transport laws that are focussed on a single flow regime, such as the flood or the mean lower low water regime, the large-scale transport law must take into account each of these regimes in order to reproduce properly both the flood processes, such as the deposition of clays on flood plains, and the mean lower low water processes, such as the fluviatile incision and the fast transport of the sediments to the deltaic area.

In this type of wild flow, it is assumed that all the directions in space whose slope is positive may have been followed by the water. However, selection of these directions is achieved at every moment by taking the path with the greatest slope. It must thus be considered that the probability of selecting a direction rather than another is equal to the ratio of the slope of this direction to the sum of all of the slopes. The greater the slope of a direction in relation to the other directions, the more likely the water is to flow in this direction. This wild flow is the average of all the straight flows occurred during the simulation time interval.

c) The uniform flow corresponding more particularly to the case where the previous reasoning is generalized by adopting a large time scale of the order of a hundred thousand years. It can then be assumed that the relief has reached a state of equilibrium. The water flow then becomes uniform and there are no privileged areas such as an incised valley or a meanderization belt. Such a water flow leads to a uniform sediment diffusion.

These three flow types, for which every combination is possible, thus represent three observations of the drainage pattern of a basin over different lengths of time. These flows correspond to the passage to the average of the straight flows giving birth to the wild flow, and of the wild flows giving birth to the uniform flow.

In order take into account of the fact that, in the wild and uniform flow types, the water flux no longer has a single direction but an infinite number of probable directions, it has been decided to replace the term water flux, which has a directional meaning, by the term water efficiency. This water efficiency has thereafter been normalized by dividing the water flux by a reference flux.

Extrapolation to the marine area

A transport law applicable to the marine area has also been selected. To that effect, the various sediment transports have been grouped together according to the origin of their motive energy, by distinguishing "gravity" flows getting their kinetic energies from a transformation of the potential energy of the water flow, and flows induced by the motion of the waves under the action of the winds.

It has been established that the gravity flow of sediments could be simulated by a diffusion equation of the same type as that defined by Kenyon and Turcotte, 1985, mentioned above.

Similarly, three flow types have been considered, the first one being the straight flow where the water is channelled at every moment, the wild flow where the average water flow is considered by taking account, in the calculation, of the distribution of the water, and the uniform flow that induces a uniform diffusion of the sediments leading to a regression of the littoral in the non-supplied areas and to a stagnation of the littoral in the area situated near to the deltaic mouth.

Selection of the flow type depends on the value of the time interval between two simulation instants and on the fluvial hydrodynamism of the basin. If the time interval is short or the hydrodynamism is high, a straight flow has to be simulated. In the opposite case, a wild or even a uniform flow allows representation of the envelope of the sedimentary bodies.

For the creation of the model according to the invention, it is considered that the empirical extrapolation of the diffusion equation to the whole basin is valid in the case of "gravity" flows.

Wave-induced sediment transport

As for fluviatile flows, it is possible to combine fluid mechanics laws in order to obtain a small time scale law (from several days to several months) describing the transport of sediments induced by waves. On the other hand, extrapolation of such a law on large time scale is not possible. It is extremely difficult to reconstruct the precise morphology of the oceans for each sedimentary filling stage and thus to define a complete geologic model. Empirical laws describing the evolution of littorals on a large time scale, relating the sediment flux induced by the waves to local parameters such as the slope of the basin and the local wave characteristics, have been used.

Wave-induced orthogonal marine transport to the littoral

In the model, sediment transport to the littoral is simulated by a diffusion equation and it is incorporated in the fluvial transport described above by means of a negative diffusion coefficient representing the brake generated by the waves against the fluvial transport. Because of physical and numerical stability problems of the sedimentary system, it has been considered that the waves slow down the motion of the sediments towards the open sea, but they cannot generate a residual sediment flux towards the littoral at the scale of the millennium, and therefore this break can never reverse the direction of transport of the sediments. In order to take account of the decrease in the activity of the waves in the direction of the open sea, it has been assumed that the coefficient decreases exponentially with the bathymetry.

Wave-induced littoral drift

In order to quantify the littoral drift, an empirical relation connecting the sediment flux flowing at a given point to the total energy of the wave motion and to an attenuation factor linked with the bathymetry is used, so as to use only local parameters.

Simultaneous transport of several lithologies

The large-scale transport laws mentioned above have been established for a soil consisting of a single lithology. In order take into account of cases where multiple lithologies are simultaneously transported, the following relations comprising relative diffusion coefficients are used:

for each lithology $$i \rightarrow \overline{Q_i} = v_i \ K_i \ E_{water} \ \nabla h$$

with
$\overline{Q_i}$ flux of the lithology i (in m$^2$/s)
$v_i$ lithology i content (dimensionless)
$K_i$ relative diffusion coefficient of the lithology i (in m$^2$/s)
$E_{water}$ water efficiency (dimensionless)
h altitude of the ground surface (in m)
and $$K_i = K_{fluv,i} - K_{waves,i}.$$

These large-scale transport equations are coupled with the mass conservation principle applied to each lithology in order to define, at any point of the basin, the rate of erosion or of sedimentation and the proportion of each of the lithologies.

Sediment availability and weathering layer

In order to take into account the unequal diffusivity of the sediments of each lithology, it has been considered, as already described by Rivenaes, J. J., 1988, mentioned above, that there is a layer of constant thickness (decimetric for example), referred to as surface weathering layer, in which the sediments are transported. The sediment flux is then proportional to the lithologic contents of the weathering layer.

For the construction of the model according to the invention, it has been chosen to estimate the weathering velocity, or velocity of creation of this surface weathering layer, at each point of the basin by means of an empirical relation.

In view of all that has been written before, the following two empirical large-scale transport laws have been selected for the model according to the invention, the first relative to the diffusive transport, the second to the littoral transport:

for each lithology $i$ diffusion → $\overline{Q_i} = v_i K_{D,i} E_{water} \overline{\nabla} h$
$Q_i$ diffusive flux of the lithology $i$ (in $m^2/s$)
$v_i$ lithology $i$ content (dimensionless)
$K_{D,i}$ relative diffusion coefficient of the lithology $i$ (in $m^2/s$)
$E_{water}$ water efficiency (dimensionless)
$h$ altitude of the ground surface (in $m$)
and
$K_i = K_{fluv,i} - K_{waves,i}$ for each lithology $i$
littoral drift → $Q_s = K_{L,i} E C_g f(b) \sin\alpha\cos\alpha$ with $f(b) = \begin{cases} b/b_B \text{ if } b \leq b_B \\ e^{-a(b-b_B)} \text{ if } b > b_B \end{cases}$ $Q_s$ flux of the lithology $i$ induced by the littoral drift (in $m^2/s$)
$K_{L,i}$ efficiency of the transport of the lithology $i$ by the waves
$E$ wave energy density $\left( = \frac{1}{8} \rho r c g H^2 \right)$
$C_g$ rate of propagation of the wave energy
$f(b)$ flux distribution function according to the bathymetry
$\alpha$ angle of approach of the waves Numerical solution Creation of the model according to the invention comprises the numerical solution of the transport equations, based on a spatial discretization of the basin studied and a temporal discretization of the formation.

The basin studied is decomposed into square grids of constant size, while the filling of this grid pattern is simulated at the level of a succession of calculating times separated by a constant time interval. The width of the grids is for example of the order of 1 to 10 kilometers according to the basin simulated, while the time interval is of the order of 50 000 years.

The transport equations are thereafter solved by means of an explicit numerical pattern where the physical parameters such as the flux or the altitude at the time (n+1) are expressed as a function of parameters measured at the time (n) and whose values are thus known.

In the 2D monolithologic case, this solution is thus expressed by the set of equations as follows:

$$Q = -K \frac{\partial h}{\partial x} \rightarrow \text{in each grid } i \; Q_i^{(n+1)} = -K_i^{(n)} \frac{h_{i+1}^{(n)} - h_i^{(n)}}{dx} \quad (1)$$

$$\frac{\partial h}{\partial t} = -\frac{\partial Q}{\partial x} \rightarrow \text{in each grid } i \frac{h_i^{(n+1)} - h_i^{(n)}}{dt} = -\frac{Q_i^{(n+1)} - Q_{i-1}^{(n+1)}}{dx} \quad (2)$$

i.e. $h_i^{(n+1)} = h_i^{(n)} + \frac{dt}{dx^2} \left( K_i^{(n)} \frac{h_{i+1}^{(n)} - h_i^{(n)}}{dx} - K_i^{(n)} \frac{h_i^{(n)} - h_{i-1}^{(n)}}{dx} \right)$ with $h_i^{(n)}$ altitude of the grid $i$ and at the time n (in m)
$K_i^{(n)}$ diffusion coefficient at the level of the grid $i$ (in $m^2/s$)
$Q_i^{(n)}$ sediment flux between the grids $i$ and $i+1$ (in $m^2/s$)
dt time interval (in s)
dx grid width (in m).

This rather simple writing becomes nevertheless more complex when passing to 3D multilithology and on taking into account the restriction of the sediment transport to the weathered layer. In such a case, we have:

$$\frac{\partial h}{\partial t} = -V_i \max, \text{ i.e.}$$

$$h_i^{(n+1)} = h_i^{(n)} - V_i \cdot dt$$

The explicit finite volume solution is the fastest calculating method. Furthermore, it provides very precise results when remaining in the algorithm stability range, which requires very short internal calculating time intervals, of the order of a century to a millennium.

Application of the model to the input data formed from field data allows the simulation of the sediment transport over all of the basin studied.

The validity of the simulation is thereafter tested by comparing the results provided by the model with the data collected in the field, mainly the sediment thicknesses and the facies observed on well logs.

In case of a discrepancy, the set of input parameters of the model is sought by inversion: accomodation and amount of sediments transported, so that the difference between the results obtained with these parameters and the constraints imposed is minimal, as schematized hereafter:

direct model → S=M(p)

difference function → E(p)=∥S−C∥ with
p whole of the input parameters of the model
M whole of the equations governing the model
S whole of the results at the model output
C whole of the geologic constraints
E difference function between the results and the constraints
∥x∥ measurement of the difference between the results and the constraints inversion → find $\overline{p}$ such that $\tilde{E}=E(\overline{p})$ is the absolute minimum of the function E $\forall p, E(p) \geq \tilde{E}$.

Within the scope of the present method, the aim of the inversion is thus to quantify in particular the values of the accomodation, of the sedimentary deposits and of the diffusion coefficients in order to obtain a simulation whose sedimentary bodies geometries, thicknesses and facies measured straight below the calibration wells are as close as possible to the geologic constraints.

A trial-and-error type method is used. An initial set of parameters is defined. The solution of the model linked with these parameters is calculated, and the value of the parameters is modified according to the difference between the solution and the geologic constraints. This process is continued until the difference becomes slight enough.

When the optimum concordance is obtained, the simulation leads to quantitative data on the geometry of the basin and the lithologies of the sedimentary units. It also allows the checking of the coherence of the wells correlation pattern.

Geologic validation of the model obtained

The validity of the model thus obtained has been tested on 2D or 3D simple theoretical cases. The subsidence velocity, the sedimentary deposit rate and the sediment diffusivity for example were assumed to be constant. By defining the eustasy according to one or two cyclicity orders, it was possible to show, by means of these simple but realistic cases, that the diffusive model allows the reproduction of implications of the genetic stratigraphy concepts, such as the volumetric partitioning of the sediments within a genetic unit and the distorsion of the genetic units. The geologic coherence of the simulation results allows the validation empirically of the use of the multilithologic diffusion equation on large time and space scales.

The model was also tested on real cases. The size of the sedimentary objects simulated is typically at the scale of a reservoir: Mesa Verde Group of the San Juan basin (Colorado, USA), for example, and at the scale of a basin: the lower Cretaceous in the Paris Basin, and it has allowed the development the inversion method used, by means of which the parameters of the model (accomodation, sedimentary deposits and diffusion coefficients) are defined from the geologic constraints (thicknesses and facies of the sedimentary layers) with the trial-and-error method.

This inversion, coupled with the non-dimensioning principle of the diffusion equation, allows the obtaining of simulations whose results are adjusted to the geologic constraints. It has been checked that the diffusive model used allows the obtaining of very precise simulations, with mean differences for the cumulative thicknesses of the sediments of the order of 5 meters to 25 kilometers away from the constraint wells (for a formation with a mean thickness of the order of 100 meters), and a difference between the simulated and observed shores position below 10 kilometers (the size of the calculating grids being 10 kilometers).

As a result of this geometric and faciologic reconstruction and of the access to the large-scale physics of the sedimentary processes, the diffusive model according to the invention allows a return to the geologic data bases by refining for example the value of the bathymetries and of the sediments flows by reproducing the evolution of the accomodation with time and by confirming or invalidating the selection of a correlation pattern.

We claim:

1. A method for constructing a deterministic model of a diffusive type for simulating a multilithologic filling of a sedimentary basin comprising:

obtaining field data from the sedimentary basin relating to architecture of the basin, obtaining data from measurements of well logging data or from measurement of seismic data, creating a set of input data relating to an accommodation by subsidence and eustasy, to fluviatile or marine sediment deposits and to transport thereof, and to physical parameters including diffusion coefficients of various lithologies;

gridding of the basin into grids of regular dimensions by an iterative process;

solving large-scale diffusive transport equations according to an explicit finite volume pattern with constant time intervals to simulate flux of each lithology deposited on each grid; and comparing the simulated flux with the field data and a stepwise modification of the input data by inversion.

2. A method as claimed in claim 1, wherein the inversion stage is achieved by means of a trial-and-error method.

3. A method as claimed in claim 2, wherein the large-scale diffusive transport of each lithology is modeled by means of the relationship:

diffusion → $\overline{Q}_i = v_i K_{D,i} E_{water} \overline{\nabla} h$
$Q_i$ diffusive flux of the lithology $i$ (in $m^2/s$)
$v_i$ lithology $i$ content (dimensionless)
$K_{D,i}$ relative diffusion coefficient of the lithology $i$ (in $m^2/s$)
$E_{water}$ water efficiency (dimensionless)
$h$ altitude of the ground surface (in $m$)
and
$K_i = K_{flux,i} - K_{waves,i}$ 4. A method as claimed in claim 2, wherein a large-scale littoral transport of each lithology is modeled by means of the relationship:

littoral drift → $Q_s = K_{L,i} E C_g f(b) \sin\alpha\cos\alpha$ with $f(b) = \begin{cases} b/b_B \text{ if } b \leq b_B \\ e^{-a(b-b_B)} \text{ if } b > b_B \end{cases}$ $Q_s$ flux of the lithology $i$ induced by the littoral drift (in $m^2/s$)
$K_{L,i}$ efficiency of the transport of the lithology $i$ by the waves
$E$ wave energy density $\left(=\frac{1}{8} \rho r c g H^2\right)$
$C_g$ rate of propagation of the wave energy
$f(b)$ flux distribution function according to the bathymetry
$\alpha$ angle of approach of the waves 5. A method as claimed in claim 2, wherein multilithologic filling of the sedimentary basin with sedimentary layers is defined as a superposition of lithologies with porosities considered to be independent of one another.

6. A method as claimed in claim 2, wherein an introduction and a production of sediments of the sedimentary basin are modeled by using a relationship such that:

For each lithology $i$ → $P_i = P_{o,i} B_i \prod_{j \neq i} F_{j,i}$ with $\begin{cases} P_i & \text{production rate of the lithology } i (en\ m/s) \\ P_{o,i} & \text{maximum production rate of the lithology } i (\text{in } m/s) \end{cases}$ -continued $$\left\{ \begin{array}{l} \text{influence of the bathymetry} \quad B_i = \begin{cases} 0 & \text{if } b \leq 0 \\ \dfrac{b}{b_i} & \text{if } 0 < b \leq b_i \\ e^{-\beta_i(b-b_i)} & \text{if } b > b_i \end{cases} \\ \\ \text{influence of the lithology } j \quad F_{j,i} = \begin{cases} 1 & \text{if } Q_j \leq S_{j,i} \\ e^{-\gamma_{j,i}(Q_j - S_{j,i})} & \text{if } Q_j > S_{j,i} \end{cases} \end{array} \right.$$

$$\begin{cases} B_i & \text{influence of the bathymetry (dimentsionless)} \\ b & \text{bathymetry (in } m) \\ b_i & \text{bathymetric threshold (in } m) \\ \beta_i & \text{attenuation coefficient (in } m^{-1}) \end{cases}$$

$$\begin{cases} F_{j,i} & \text{sensitivity of the lithology } i \text{ to the flux of the lithology } jj \\ Q_j & \text{flux of the lithology } j(\text{in } m^2/s) \\ S_{j,i} & \text{inhibition start threshold(in } m^2/s) \\ \gamma_{j,i} & \text{sensitivity coefficient(in } m^2/s). \end{cases}$$

7. A method as claimed in claim 1, wherein the large-scale diffusive transport of each lithology is modeled by means of the relationship:

$$\text{For each lithology } i \rightarrow P_i = P_{o,i} B_i \prod_{j \neq i} F_{j,i}$$

$$\text{with } \begin{cases} P_i & \text{production rate of the lithology } i(en\ m/s) \\ P_{o,i} & \text{maximum production rate of the lithology } i(\text{in } m/s) \end{cases}$$

$$\left\{ \begin{array}{l} \text{influence of the bathymetry} \quad B_i = \begin{cases} 0 & \text{if } b \leq 0 \\ \dfrac{b}{b_i} & \text{if } 0 < b \leq b_i \\ e^{-\beta_i(b-b_i)} & \text{if } b > b_i \end{cases} \\ \\ \text{influence of the lithology } j \quad F_{j,i} = \begin{cases} 1 & \text{if } Q_j \leq S_{j,i} \\ e^{-\gamma_{j,i}(Q_j - S_{j,i})} & \text{if } Q_j > S_{j,i} \end{cases} \end{array} \right.$$

$$\begin{cases} B_i & \text{influence of the bathymetry (dimentsionless)} \\ b & \text{bathymetry (in } m) \\ b_i & \text{bathymetric threshold (in } m) \\ \beta_i & \text{attenuation coefficient (in } m^{-1}) \end{cases}$$

$$\begin{cases} F_{j,i} & \text{sensitivity of the lithology } i \text{ to the flux of the lithology } jj \\ Q_j & \text{flux of the lithology } j(\text{in } m^2/s) \\ S_{j,i} & \text{inhibition start threshold(in } m^2/s) \\ \gamma_{j,i} & \text{sensitivity coefficient(in } m^2/s). \end{cases}$$

diffusion $\rightarrow \overline{Q_i} = v_i K_{D,i} E_{water} \overline{\nabla} h$
$\overline{Q_i}$ diffusive flux of the lithology $i$ (in $m^2/s$)
$v_i$ lithology $i$ content (dimensionless)
$K_{D,i}$ relative diffusion coefficient of the lithology $i$ (in $m^2/s$)
$E_{water}$ water efficiency (dimensionless)
$h$ altitude of the ground surface (in $m$)
and
$K_i = K_{fluv,i} - K_{waves,i}$

8. A method as claimed in claim 7, wherein a large-scale littoral transport of each lithology is modeled by means of the relationship:

littoral drift $\rightarrow Q_s = K_{L,i} E C_g f(b) \sin\alpha\cos\alpha\overline{\tau}$ $\text{with } f(b) = \begin{cases} b/b_B \text{ if } b \leq b_B \\ e^{-a(b-b_B)} \text{ if } b > b_B \end{cases}$ $Q_s$ flux of the lithology $i$ induced by the littoral drift (in $m^2/s$)
$K_{L,i}$ efficiency of the transport of the lithology $i$ by the waves
$E$ wave energy density $\left( = \dfrac{1}{8} \rho rcgH^2 \right)$
$C_g$ rate of propagation of the wave energy
$f(b)$ flux distribution function according to the bathymetry
$\alpha$ angle of approach of the waves

9. A method as claimed in claim 7, wherein multilithologic filling of the sedimentary basin with sedimentary layers is defined as a superposition of lithologies with porosities considered to be independent of one another.

10. A method as claimed in claim 7, wherein an introduction and a production of sediments of the sedimentary basin are modeled by using a relationship such that:

11. A method as claimed in claim 1, wherein a large-scale littoral transport of each lithology is modeled by means of the relationship:

littoral drift $\rightarrow Q_s = K_{L,i} E C_g f(b) \sin\alpha\cos\alpha\overline{\tau}$ $\text{with } f(b) = \begin{cases} b/b_B \text{ if } b \leq b_B \\ e^{-a(b-b_B)} \text{ if } b > b_B \end{cases}$ $Q_s$ flux of the lithology $i$ induced by the littoral drift (in $m^2/s$)
$K_{L,i}$ efficiency of the transport of the lithology $i$ by the waves
$E$ wave energy density $\left( = \dfrac{1}{8} \rho rcgH^2 \right)$
$C_g$ rate of propagation of the wave energy
$f(b)$ flux distribution function according to the bathymetry
$\alpha$ angle of approach of the waves

12. A method as claimed in claim 11, wherein multilithologic filling of the sedimentary basin with sedimentary layers is defined as a superposition of lithologies with porosities considered to be independent of one another.

13. A method as claimed in claim 11, wherein an introduction and a production of sediments of the sedimentary basin are modeled by using a relationship such that:

For each lithology $i \Rightarrow P_i = P_{o,i} B_i \prod_{j \neq i} F_{j,i}$ with $\begin{cases} P_i & \text{production rate of the lithology } i(en\ m/s) \\ P_{o,i} & \text{maximum production rate of the lithology } i(\text{in } m/s) \end{cases}$ $$\begin{cases} \text{influence of the bathymetry} \quad B_i = \begin{cases} 0 & \text{if } b \leq 0 \\ \dfrac{b}{b_i} & \text{if } 0 < b \leq b_i \\ e^{-\beta_i(b-b_i)} & \text{if } b > b_i \end{cases} \quad \begin{cases} B_i & \text{influence of the bathymetry (dimentsionless)} \\ b & \text{bathymetry (in } m) \\ b_i & \text{bathymetric threshold (in } m) \\ \beta_i & \text{attenuation coefficient (in } m^{-1}) \end{cases} \\ \\ \text{influence of the lithology } j \quad F_{j,i} = \begin{cases} 1 & \text{if } Q_j \leq S_{j,i} \\ e^{-\gamma_{j,i}(Q_j - S_{j,i})} & \text{if } Q_j > S_{j,i} \end{cases} \quad \begin{cases} F_{j,i} & \text{sensitivity of the lithology } i \text{ to the flux of the lithology } jj \\ Q_j & \text{flux of the lithology } j(\text{in } m^2/s) \\ S_{j,i} & \text{inhibition start threshold(in } m^2/s) \\ \gamma_{j,i} & \text{sensitivity coefficient(in } m^2/s). \end{cases} \end{cases}$$

14. A method as claimed in claim 1, wherein multilithologic filling of the sedimentary basin with sedimentary layers is defined as a superposition of lithologies with porosities considered to be independent of one another.

15. A method as claimed in claim 14, wherein an introduction and a production of sediments of the sedimentary basin are modeled by using a relationship such that:

For each lithology $i \Rightarrow P_i = P_{o,i} B_i \prod_{j \neq i} F_{j,i}$ with $\begin{cases} P_i & \text{production rate of the lithology } i(en\ m/s) \\ P_{o,i} & \text{maximum production rate of the lithology } i(\text{in } m/s) \end{cases}$ $$\begin{cases} \text{influence of the bathymetry} \quad B_i = \begin{cases} 0 & \text{if } b \leq 0 \\ \dfrac{b}{b_i} & \text{if } 0 < b \leq b_i \\ e^{-\beta_i(b-b_i)} & \text{if } b > b_i \end{cases} \quad \begin{cases} B_i & \text{influence of the bathymetry (dimentsionless)} \\ b & \text{bathymetry (in } m) \\ b_i & \text{bathymetric threshold (in } m) \\ \beta_i & \text{attenuation coefficient (in } m^{-1}) \end{cases} \\ \\ \text{influence of the lithology } j \quad F_{j,i} = \begin{cases} 1 & \text{if } Q_j \leq S_{j,i} \\ e^{-\gamma_{j,i}(Q_j - S_{j,i})} & \text{if } Q_j > S_{j,i} \end{cases} \quad \begin{cases} F_{j,i} & \text{sensitivity of the lithology } i \text{ to the flux of the lithology } jj \\ Q_j & \text{flux of the lithology } j(\text{in } m^2/s) \\ S_{j,i} & \text{inhibition start threshold(in } m^2/s) \\ \gamma_{j,i} & \text{sensitivity coefficient(in } m^2/s). \end{cases} \end{cases}$$

16. A method as claimed in claim 1, wherein an introduction and a production of sediments of the sedimentary basin are modeled by using a relationship such that:

For each lithology $i \Rightarrow P_i = P_{o,i} B_i \prod_{j \neq i} F_{j,i}$ with $\begin{cases} P_i & \text{production rate of the lithology } i(en\ m/s) \\ P_{o,i} & \text{maximum production rate of the lithology } i(\text{in } m/s) \end{cases}$ -continued $$\left\{ \begin{array}{l} \text{influence of the bathymetry} \quad B_i = \left\{ \begin{array}{ll} 0 & \text{if } b \leq 0 \\ \dfrac{b}{b_i} & \text{if } 0 < b \leq b_i \\ e^{-\beta_i(b-b_i)} & \text{if } b > b_i \end{array} \right. \quad \left\{ \begin{array}{ll} B_i & \text{influence of the bathymetry (dimentsionless)} \\ b & \text{bathymetry (in } m\text{)} \\ b_i & \text{bathymetric threshold (in } m\text{)} \\ \beta_i & \text{attenuation coefficient (in } m^{-1}\text{)} \end{array} \right. \\[2em] \text{influence of the lithology } j \quad F_{j,i} = \left\{ \begin{array}{ll} 1 & \text{if } Q_j \leq S_{j,i} \\ e^{-\gamma_{j,i}(Q_j - S_{j,i})} & \text{if } Q_j > S_{j,i} \end{array} \right. \quad \left\{ \begin{array}{ll} F_{j,i} & \text{sensitivity of the lithology } i \text{ to the flux of the lithology } jj \\ Q_j & \text{flux of the lithology } j \text{(in } m^2/s\text{)} \\ S_{j,i} & \text{inhibition start threshold(in } m^2/s\text{)} \\ \gamma_{j,i} & \text{sensitivity coefficient(in } m^2/s\text{)} \end{array} \right. \end{array} \right.$$

15

\* \* \* \* \*